(12) United States Patent
Wang et al.

(10) Patent No.: US 12,449,371 B2
(45) Date of Patent: Oct. 21, 2025

(54) SENSING DEVICE WITH A SEALING STRUCTURE

(71) Applicant: Mettler-Toledo Instruments (Shanghai) Co., Ltd., Shanghai (CN)

(72) Inventors: Zhongjun Wang, Shanghai (CN); Changlin Wang, Shanghai (CN); Min Xu, Shanghai (CN); Hui Zhang, Shanghai (CN); Rudolf Tamas Gati, Shanghai (CN)

(73) Assignee: Mettler-Toledo Instruments (Shanghai) Co., Ltd., Shanghai (CN)

( * ) Notice: Subject to any disclaimer, the term of this patent is extended or adjusted under 35 U.S.C. 154(b) by 286 days.

(21) Appl. No.: 18/267,850

(22) PCT Filed: Dec. 17, 2021

(86) PCT No.: PCT/CN2021/139345
§ 371 (c)(1),
(2) Date: Jun. 16, 2023

(87) PCT Pub. No.: WO2022/127922
PCT Pub. Date: Jun. 23, 2022

(65) Prior Publication Data
US 2024/0053275 A1    Feb. 15, 2024

(30) Foreign Application Priority Data
Dec. 18, 2020   (CN) .......................... 202011511216.6

(51) Int. Cl.
*G01N 21/09* (2006.01)
*G01D 11/24* (2006.01)
(Continued)

(52) U.S. Cl.
CPC ....... *G01N 21/8507* (2013.01); *G01D 11/245* (2013.01); *G01D 11/26* (2013.01); *G01N 21/09* (2013.01); *G01N 2201/0227* (2013.01)

(58) Field of Classification Search
CPC .. G01N 21/8507; G01N 21/09; G01D 11/245; G01D 11/26
See application file for complete search history.

(56) References Cited

U.S. PATENT DOCUMENTS 6,587,195 B1 *  7/2003  Jennings ................ G01N 21/03
                                                            250/343
8,206,649 B2    6/2012  Suzuki et al.
(Continued)

FOREIGN PATENT DOCUMENTS

DE          3822445 A1 *  1/1990
WO    WO-2020216907 A1 * 10/2020

*Primary Examiner* — Jamel E Williams
(74) *Attorney, Agent, or Firm* — Standley Law Group LLP; Jeffrey S. Standley; Adam J. Smith

(57) ABSTRACT

A sensing device with a sealing structure for measuring fluid characteristics by a photoelectric method is disclosed. The sensing device includes an electrode head having an outer side which contacts a fluid to be measured and one or more windows arranged in respective window openings which extend between an inner and an outer face of a wall of the electrode head. At least two sealing structures seal the one or more windows and the respective window openings. A first of the at least two sealing structures is bonded, welded, or provides an interference fit. The sensing device can be used to seal the product in high temperature, high pressure, and corrosive environment, so that the product has high air tightness and is stable and reliable for a long time. In addition, the sealing structure of the product is easy to clean.

14 Claims, 5 Drawing Sheets

(51) Int. Cl.
   *G01D 11/26*   (2006.01)
   *G01N 21/85*   (2006.01)

(56) References Cited

U.S. PATENT DOCUMENTS 10,816,373 B1 10/2020 Preister et al.
2019/0309253 A1 10/2019 Ott et al.

* cited by examiner

SENSING DEVICE WITH A SEALING STRUCTURE

BACKGROUND OF THE INVENTION

Technical Field

The present invention relates to the field of sensing devices for measuring fluid characteristics by a photoelectric method, and in particular to a sensing device with a sealing structure.

Background Art

In the prior art, a sensing device for measuring fluid characteristics by a photoelectric method (for example, measuring fluid turbidity, chromaticity, oxygen partial pressure, pH value, etc.) is used to determine indispensable parameters of water quality or fluid media characteristics. Moreover, this kind of device often requires products that operate in a corrosive, alternating high and low temperature and high pressure environment. The sensing device for measuring fluid characteristics by a photoelectric method must have a window, and an electrode head and the window in the sensing device needs to be sealed, a sealing interface is easily corroded or damaged by high and low temperature, which is prone to product leakage and thus, scrap.

At present, this type of product usually has a short sealing life, and requires regular replacement of a sealing element and maintenance of the product.

In view of this, there is an urgent need for those skilled in the art to improve the structure of the sensing device in order to overcome the above technical problems.

SUMMARY

The technical problems to be solved by the present invention are to overcome the defects of the sensing device in the prior art, which has a short sealing life, and requires regular replacement of a sealing element and maintenance of the product, and to provide a sensing device with a double-sealing structure.

The present invention solves the above technical problems through the following technical solution:

A sensing device with a sealing structure for measuring fluid characteristics by a photoelectric method, said sensing device characterized by comprising an electrode head and one or more windows, wherein an outer side of the electrode head is in contact with a fluid to be measured. The one or more windows are arranged in respective window openings which extend between an inner and an outer face of a wall of the electrode head, and the one or more windows and the respective window opening are sealed by at least two sealing structures.

Preferably, the window is arranged in a window opening in the side wall of the electrode head. Preferably, the window is a light window, which is a window transparent to light.

According to an embodiment of the present invention, the electrode head has an inwardly recessed structure, and the one or more windows is disposed in a groove of the inwardly recessed structure.

According to an embodiment of the present invention, bonding, welding, or interference fit is used to seal against the one or more windows and the window opening to form a first sealing structure.

According to an embodiment of the present invention, an elastic seal is used to seal between the one or more windows and the window opening to form a second sealing structure.

According to an embodiment of the present invention, the window opening has a stepped structure comprising a section with a greater opening and a section with a smaller opening; and the elastic seal is arranged in the section with the greater opening. Preferably, the window opening is a stepped opening and the elastic seal is arranged in the greater opening of the stepped opening.

According to an embodiment of the present invention, the elastic seal comprises a sealing ring.

According to an embodiment of the present invention, the sealing ring uses O-shaped elastomer.

According to an embodiment of the present invention, a sealing ring pressing plate is further comprised; and the sealing ring pressing plate is disposed on the inner face of the wall of the electrode head and at a position corresponding to the position of the elastic seal, such that pressing the sealing ring against the inner face of the wall compresses the elastic seal. Preferably, the sealing ring pressing plate is disposed on and pressed against the inner face of the side wall of the electrode head at a position corresponding to the position of the elastic seal to compress the elastic seal.

According to an embodiment of the present invention, the sealing ring pressing plate has a through hole in the center that fits with the size and position of the window.

According to an embodiment of the present invention, the one or more windows are made of organic glass, glass or industrial sapphire.

The positive improvement effects of the present invention are as follows:

The sensing device with a double-sealing structure of the present invention uses a double-sealing structure, which is suitable for sealing of product in high temperature, high pressure, and corrosive environment, so that the product has high air tightness and is stable and reliable for a long time. In addition, the sealing structure of the product is easy to clean.

BRIEF DESCRIPTION OF THE DRAWINGS

The above and other features, properties and advantages of the present invention will become clearer based on the description below in conjunction with the accompanying drawings and embodiments, and the same features are always indicated by the same reference numerals in the figures, in which.

DETAILED DESCRIPTION OF EMBODIMENTS

Figure 1:
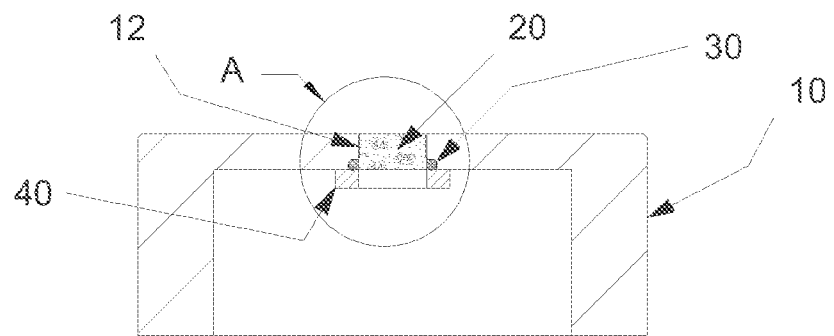
FIG. 1 is a longitudinal sectional view of a sensing device with a sealing structure according to an embodiment of the present invention.
Figure 2:
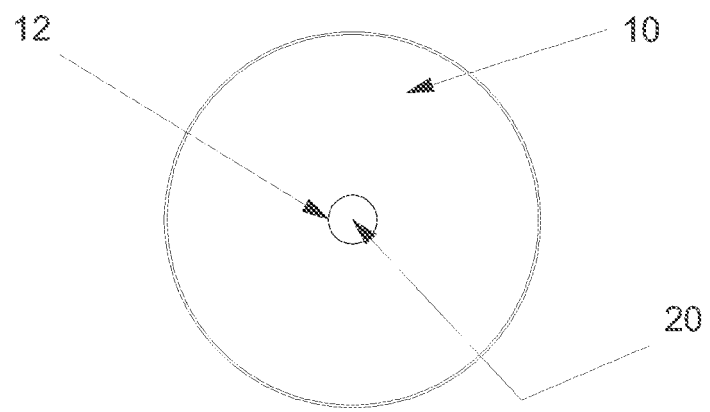
FIG. 2 is a top view of the sensing device shown in FIG. 1.

To make the above objects, features and advantages of the present invention more apparent and easier to understand, specific implementations of the present invention are described in detail below with reference to the accompanying drawings.

Embodiments of the present invention will now be described in detail with reference to the accompanying drawings. Reference will now be made in detail to preferred embodiments of the present invention, examples of which are illustrated in the accompanying drawings. The same reference numerals used in all the accompanying drawings denote identical or similar parts wherever possible.

Furthermore, although the terms used in the present invention are selected from well-known common terms, some of the terms mentioned in the description of the present invention may have been selected by the applicant according to his or her determination, and the detailed meaning thereof is described in the relevant section described herein.

Furthermore, the present invention must be understood, not simply by the actual terms used but also by the meanings encompassed by each term.

As shown in FIGS. 1 to 5, the present invention provides a sensing device with a sealing structure, the sensing device comprising an electrode head 10 and a window 20, wherein an outer side of the electrode head 10 is in contact with a fluid to be measured, and a surface thereof is a flat surface and has a window opening 12 in the center. The window 20 is arranged in the window opening 12 and the turbidity, chromaticity, oxygen partial pressure, pH value or residual chlorine of the fluid (including liquid and gas) can be measured through the electrode head.

As shown in FIGS. 5 to 9, the electrode head 10 can also have an inwardly recessed structure, and a cavity 11 is formed on an outer side of the electrode head, and the cavity receives the fluid to be measured such as a corrosive, high temperature and high pressure liquid or gas, the window 20 is arranged in the window opening 12 which extends between an inner and an outer face of a wall of the cavity 11, and the window 20 and the window opening 12 are sealed by at least two sealing structures.

In an implementation of this embodiment, as shown in FIGS. 5 to 9, the cavity 11 is preferably a V-shaped groove, an upper end face is opened as an elongated strip, and the window opening 12 is arranged on a bottom of the V-shaped groove and used for placing the window 20.

In the above implementation, as shown in FIGS. 10 to 13, three window openings 12 are provided which respectively extend between an inner and an outer face of a wall of the V-shaped groove in which three windows are arranged, including a first window 21, a second window 22 and a third window 23, wherein the first window 21 and the second window 22 are installed on the sides of the cavity 11, and the third window 23 is installed on a bottom of the cavity 11. There are multiple windows, and accordingly, the measurement range that can be measured for fluid turbidity, chromaticity, oxygen partial pressure, pH value or residual chlorine, etc. is relatively larger and more functions can be realized.

Bonding, welding, or interference fit is used to seal against the window 20 and the window opening 12 to form a first hard sealing structure. The first sealing structure can effectively prevent an external liquid from entering the product for a long time, has high mechanical strength and corrosion resistance, and can withstand external high and low temperature variations, high pressure, and chemical corrosive media.

Figure 3:
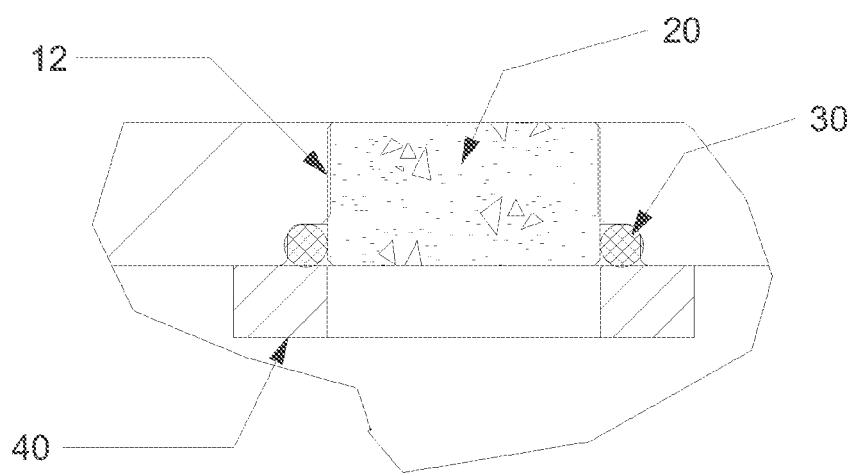
FIG. 3 is an enlarged view of portion A in FIG. 1.
Figure 4:
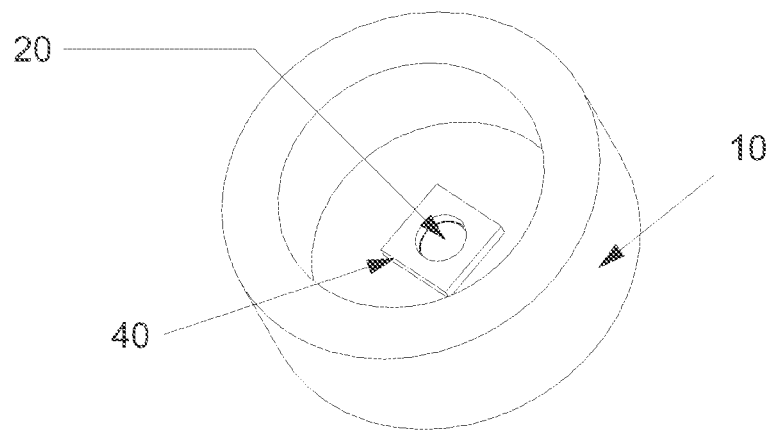
FIG. 4 is a bottom view of the sensing device shown in FIG. 1.
Figure 5:
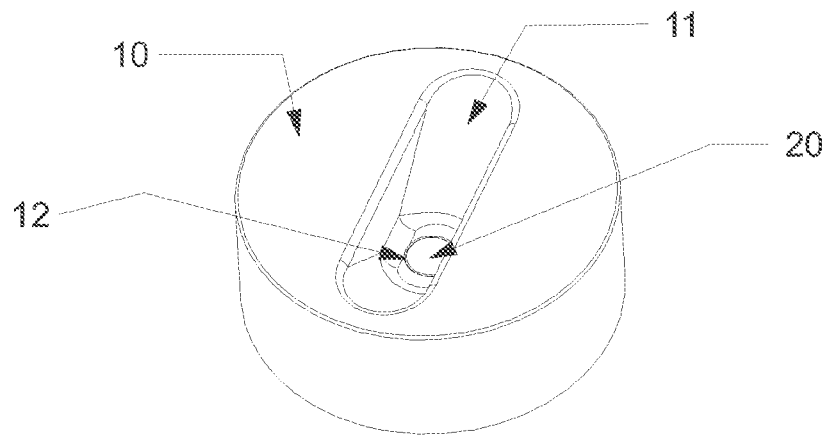
FIG. 5 is a perspective view of a sensing device with a sealing structure according to another embodiment of the present invention.
Figure 6:
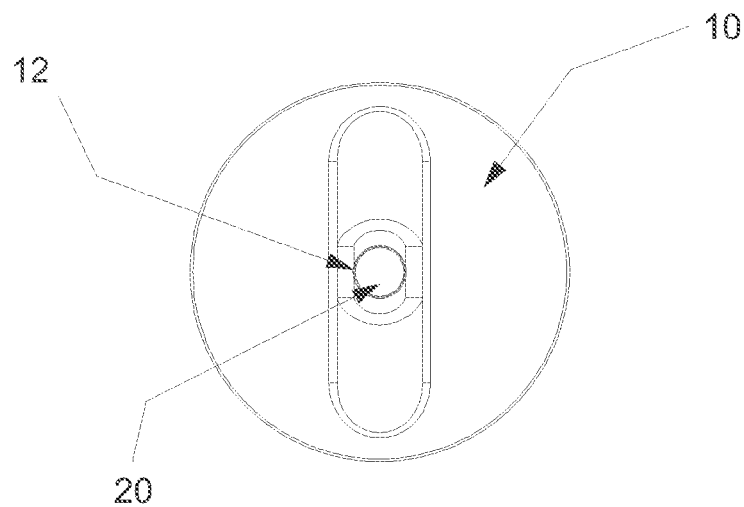
FIG. 6 is a top view of the sensing device shown in FIG. 5.
Figure 7:
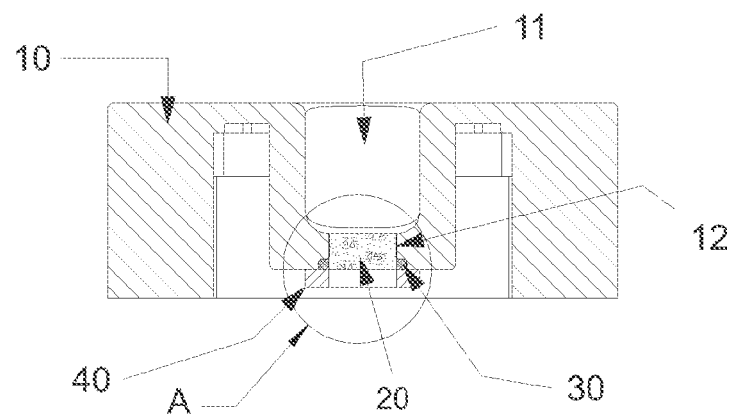
FIG. 7 is a longitudinal sectional view of the sensing device shown in FIG. 5.
Figure 8:
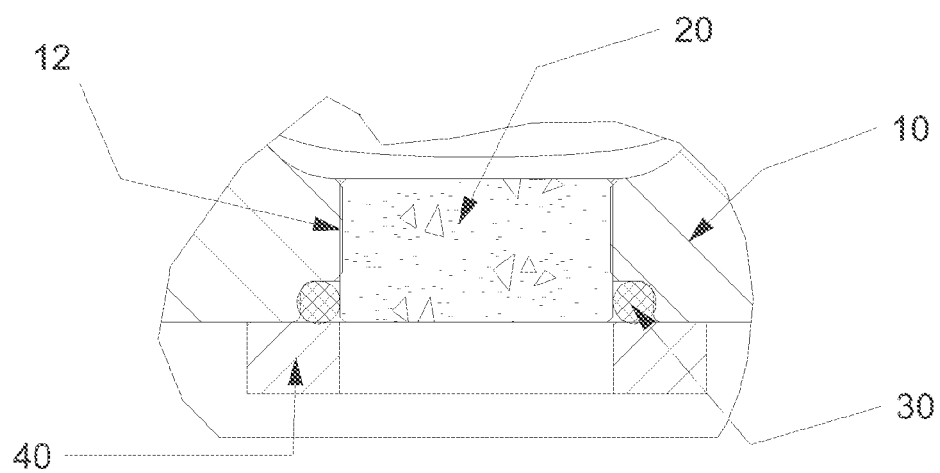
FIG. 8 is an enlarged view of portion A in FIG. 7.
Figure 9:
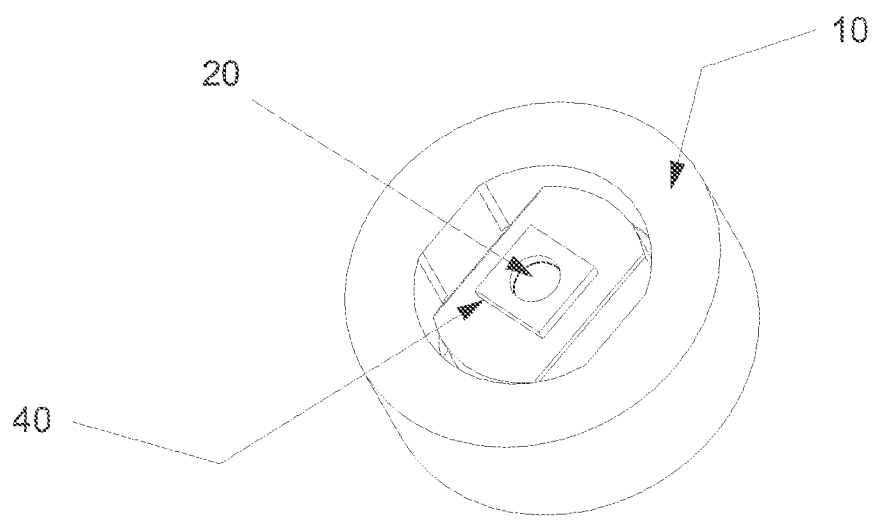
FIG. 9 is a bottom view of the sensing device shown in FIG. 7.
Figure 10:
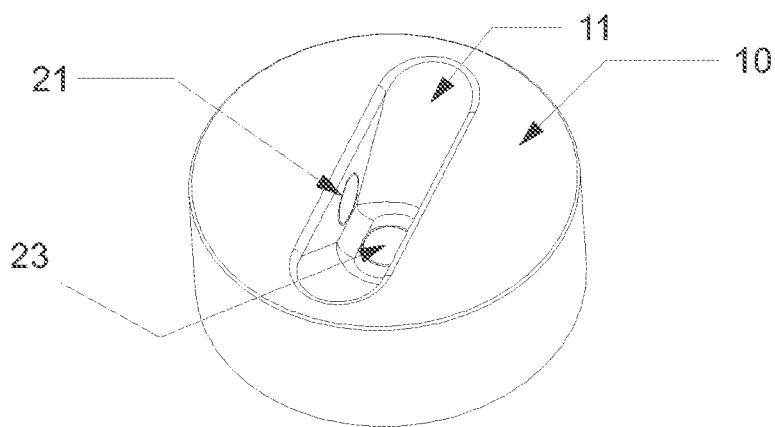
FIG. 10 is a perspective view of a sensing device with a sealing structure according to yet another embodiment of the present invention.
Figure 11:
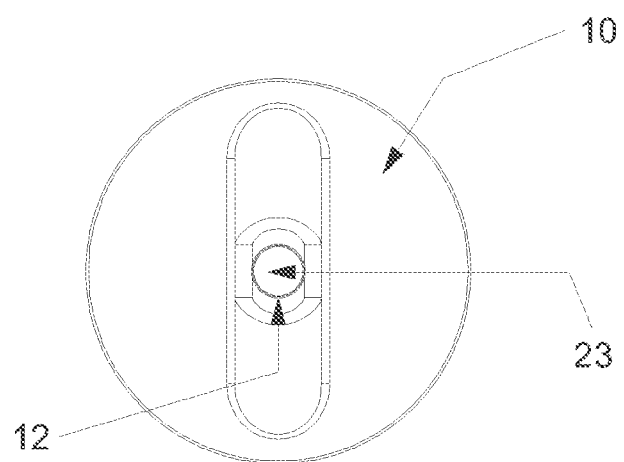
FIG. 11 is a top view of the sensing device shown in FIG. 10.
Figure 12:
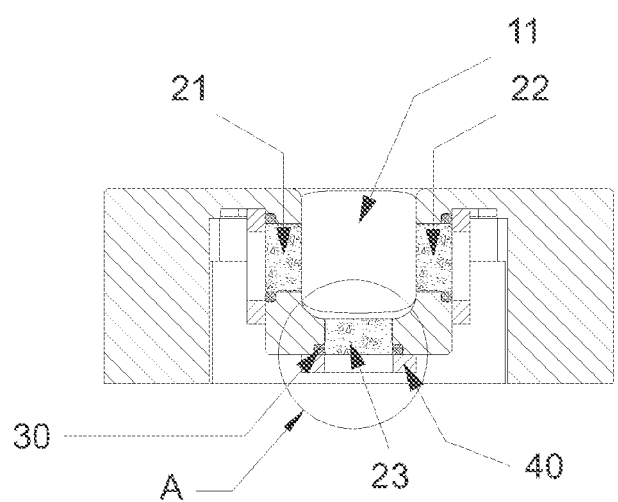
FIG. 12 is a longitudinal sectional view of the sensing device shown in FIG. 10.
Figure 13:
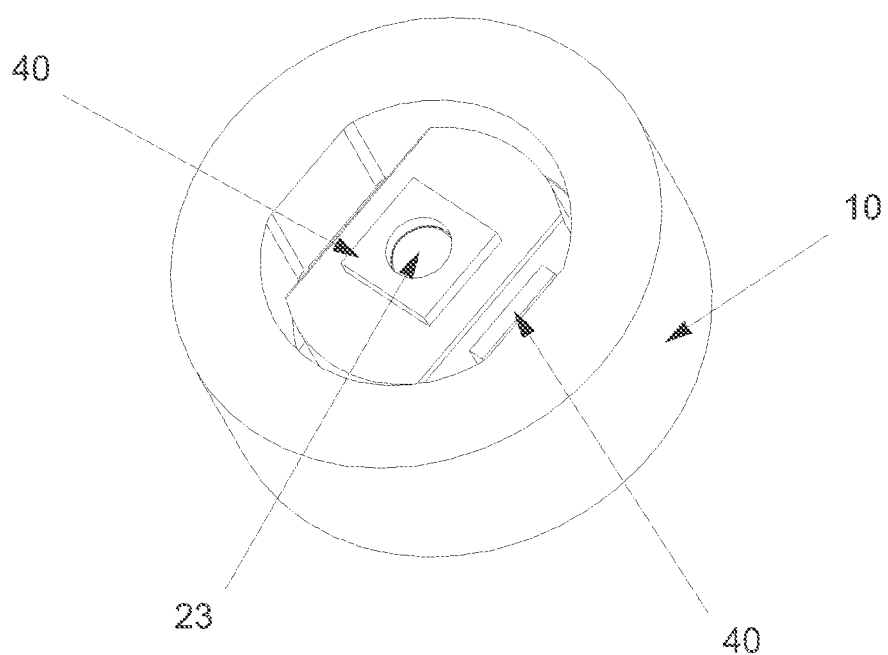
FIG. 13 is a bottom view of the sensing device shown in FIG. 10.

Soft sealing of an elastic seal 30 is used between the window 20 and an inner side of the window opening 12 of the cavity 11 to form a second sealing structure. The elastic seal 30 may preferably use O-shaped elastomer. The second sealing structure can prevent the entry of smaller molecules (such as water vapor and corrosive gas) to further enhance sealing performance, and if leakage occurs at the first sealing structure, the second sealing structure can effectively continue to maintain sealing. As shown in FIG. 3, the window opening 12 has a stepped structure comprising a section with a greater opening and a section with a smaller opening; and the elastic seal 30 is arranged in the section with the greater opening.

In a specific implementation, the seal further comprises a sealing ring pressing plate 40. The sealing ring pressing plate 40 is disposed on the inner face of the wall of the cavity 11. The sealing ring pressing plate 40 is pressed at the position corresponding to the position of the elastic seal 30 such that the elastic seal 30 can be compressed to prevent the elastic seal 30 from falling off.

The sealing pressing plate 40 has a through hole in the center that fits with the size and position of the window 20, or fits with a specifically designed light path, which thus has a light-passing function to ensure that incident light and emergent light can pass through the window 20.

Here, the window 20 is preferably made of organic glass, glass, industrial sapphire, and other materials.

Of course, the number, material, etc. of the windows herein are only examples and are not limited, and the windows can be made of multiple or various other types of materials, which are all within the scope of protection of the present application.

To sum up, the sensing device with a double-sealing structure of the present invention uses a double-sealing structure, which is especially suitable for sealing of product in high temperature, high pressure, and corrosive environment, so that the product has high air tightness and is stable and reliable for a long time. In addition, the sealing structure of the product is easy to clean.

Although specific implementations of the present invention have been described above, those skilled in the art should understand that these are merely examples, and the scope of protection of the present invention is defined by the appended claims. Various alterations or modifications to these implementations can be made by those skilled in the art without departing from the principle and essence of the present invention. However, these alterations and modifications all fall within the scope of protection of the present invention.

REFERENCE SIGNS LIST

Electrode head 10
Window 20
Cavity 11
Window opening 12

Elastic seal 30
Sealing ring pressing plate 40
First window 21
Second window 22
Third window 23

The invention claimed is:

1. A sensing device with a sealing structure for measuring fluid characteristics by a photoelectric method, said sensing device comprising:
   an electrode head;
   one or more windows, wherein an outer side of the electrode head is configured to be placed in contact with a fluid to be measured, and the one or more windows are arranged in respective window openings which extend between an inner and an outer face of a wall of the electrode head; and
   at least two sealing structures sealing the one or more windows and the respective window opening, wherein a first one of the at least two sealing structures comprises bonded molecules, welded material, or an interference fit.

2. The sensing device with the sealing structure of claim 1, wherein the electrode head has an inwardly recessed structure, and the one or more windows is disposed in a groove of the inwardly recessed structure.

3. The sensing device with the sealing structure of claim 1, wherein a second one of the at least two sealing structures comprises an elastic seal provided between the one or more windows and the window opening.

4. The sensing device with the sealing structure of claim 3, wherein:
   the window opening has a stepped structure comprising a section with a greater opening and a section with a smaller opening; and
   the elastic seal is arranged in the section with the greater opening.

5. The sensing device with the sealing structure of claim 3, wherein the elastic seal comprises a sealing ring.

6. The sensing device with the sealing structure of claim 5, wherein the sealing ring comprises an O-shaped elastomer.

7. The sensing device with the sealing structure of claim 3, wherein:
   the sensing device further comprises a sealing ring pressing plate; and
   the sealing ring pressing plate is disposed on the inner face of the wall of the electrode head at a position corresponding to the position of the elastic seal, such that pressing the sealing ring against the inner face of the wall compresses the elastic seal.

8. The sensing device with the sealing structure of claim 7, wherein the sealing ring pressing plate has a through hole in the center that fits a size and position of the window.

9. The sensing device with a sealing structure of claim 1, wherein the one or more windows comprise organic glass, glass or industrial sapphire.

10. The sensing device with a sealing structure of claim 1, wherein the first sealing structure is configured to prevent an external liquid from entering the sensing device.

11. The sensing device with a sealing structure of claim 3, wherein the second sealing structure is configured to effectively continue to maintain sealing where leakage occurs at the first one of the at least two sealing structures.

12. A sensing device with a sealing structure for measuring fluid characteristics by a photoelectric method, said sensing device comprising:
   an electrode head;
   one or more windows, wherein an outer side of the electrode head is in contact with a fluid to be measured, and the one or more windows are arranged in respective window openings which extend between an inner and an outer face of a wall of the electrode head; and
   at least two sealing structures sealing the one or more windows and the respective window opening, wherein a first one of the at least two sealing structures is formed by bonding, welding, or an interference fit;
   wherein the first sealing structure provides a liquid-tight seal.

13. The sensing device with a sealing structure of claim 12 wherein:
   a second one of the at least two sealing structures comprises an elastic seal provided between the one or more windows and the window opening.

14. The sensing device with a sealing structure of claim 13, wherein the second one of the at least two sealing structures is configured to provide a liquid-tight seal against leakage at the first one of the at least two sealing structures.

\* \* \* \* \*